Nov. 1, 1927.
E. J. PILBLAD
1,647,470
SPRING SUSPENSION AND BRAKING DEVICE
Filed Nov. 24, 1926     3 Sheets-Sheet 1
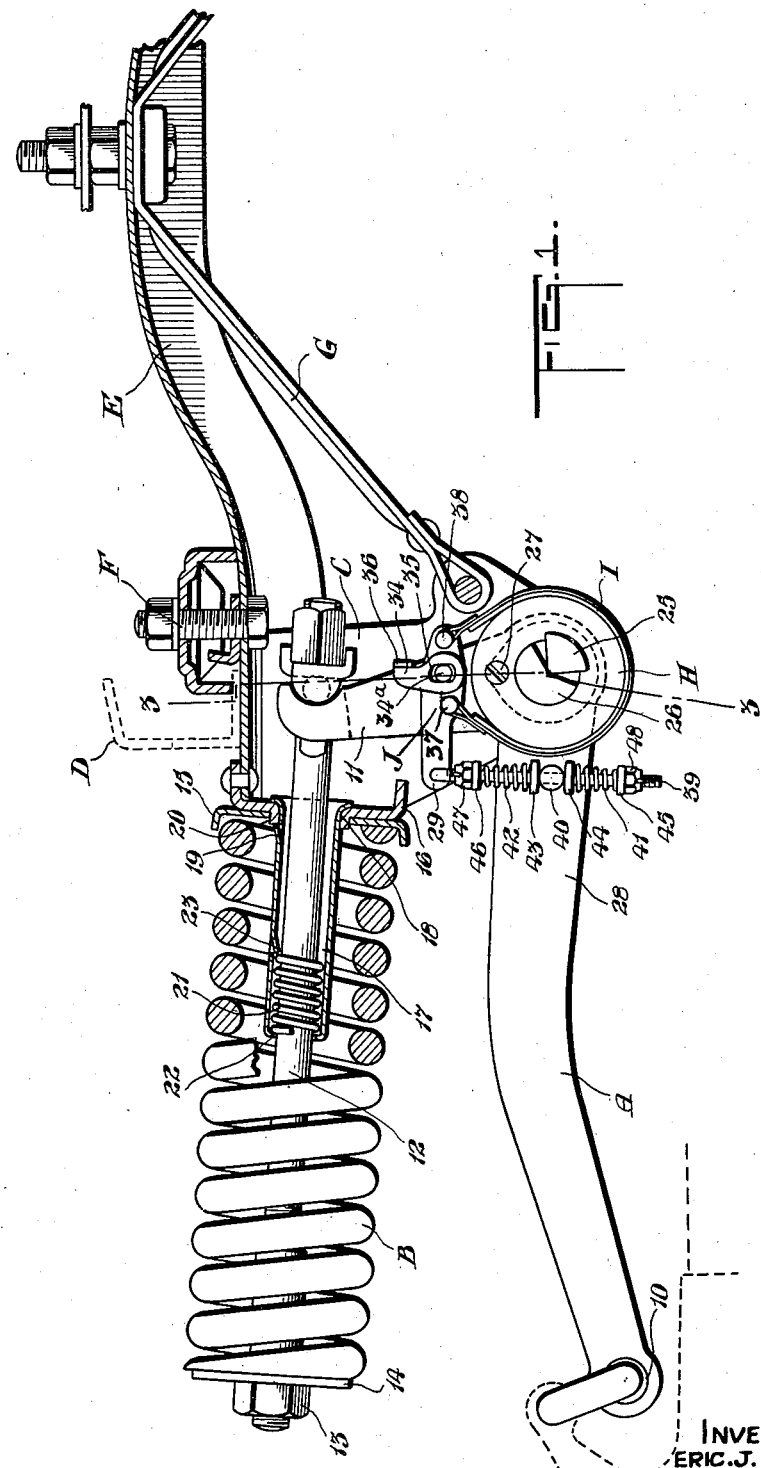
INVENTOR
ERIC. J. PILBLAD.
BY *Fetherstonhaugh+Co.*
ATT'YS.

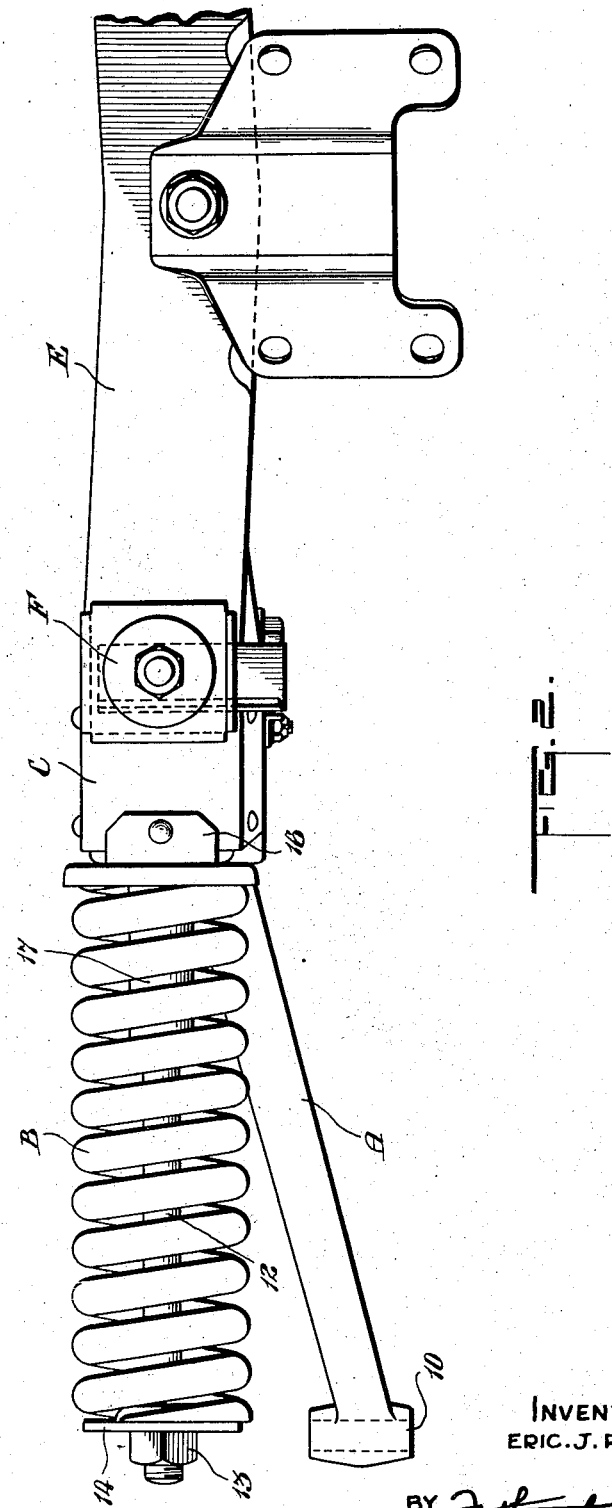

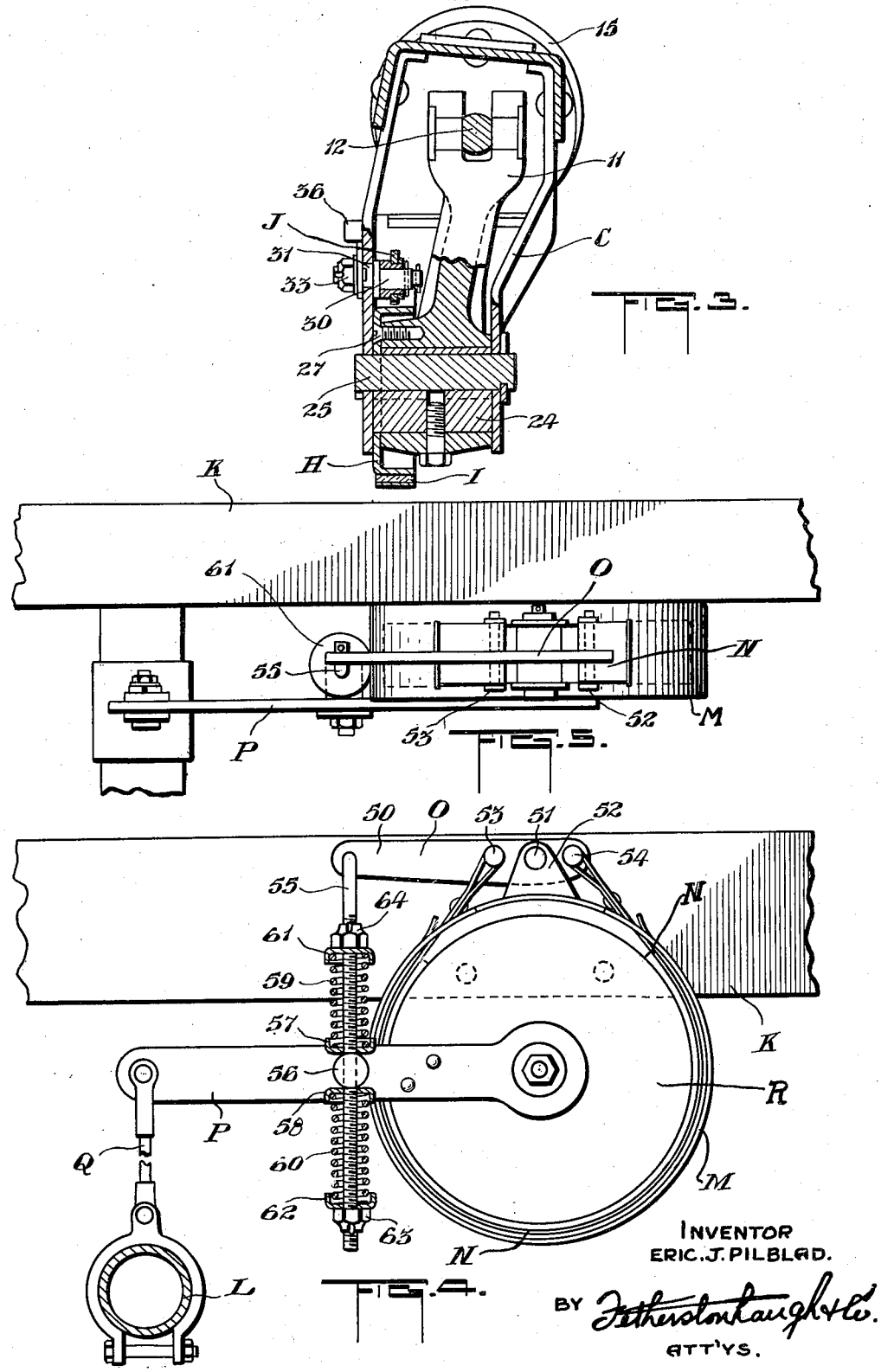

Patented Nov. 1, 1927.

1,647,470

UNITED STATES PATENT OFFICE.

ERIC J. PILBLAD, OF ROCKVILLE CENTER, NEW YORK, ASSIGNOR TO RUSSEL SUTHERLAND SMART, IN TRUST, OF OTTAWA, ONTARIO, CANADA.

SPRING SUSPENSION AND BRAKING DEVICE.

Application filed November 24, 1926. Serial No. 150,489.

This invention relates to improvements in spring suspension and braking devices of a type designed to limit and cushion the relative vibration between the axle and frame of the vehicle while moving, and the objects of the invention are to limit the amplitude of the vibration and provide effective means for gradually dissipating the kinetic energy, to thereby add to the comfort of the occupants of the vehicle during motion.

Further objects are to provide such a device as will permit the use of a softer and less stiff spring suspension, whereby the periodicity of the vibratory movement may be reduced with a resulting improvement in the riding qualities of the vehicle.

Further objects still are to provide a device which will in the manner aforesaid, regulate and cushion the rebound movement caused by the spring suspension device.

The invention purposes to add to the usual resilient resistance, which has a constant rate of gain or loss in proportion to the relative movement between the vehicle and axle, a frictional resistance or braking device which will provide resistance with an accelerated rate of gain on either side of a given point or area.

Subsidiary features of the invention relate to the manner in which this frictional resistance is applied, and to the utilization in it of the familiar self-winding or servo effect, which is possible in the relation between a brake band and drum to which it is applied.

Further objects still are generally to improve and simplify the construction of the device to enable it to better perform the functions required of it, and it consists essentially of an improved construction and arrangement of parts hereinafter described in detail in the accompanying specifications and drawings.

In the drawings, Fig. 1 is a sectional elevation of one embodiment of the invention.

Fig. 2 is a plan view of the same.

Fig. 3 is a section on the line 3—3 of Fig. 1.

Fig. 4 is a sectional elevation showing another application of the invention.

Fig. 5 is a plan view of the device shown in Fig. 4.

In the drawings, like characters of reference indicate corresponding parts in all the figures.

Referring to the drawings, Figs. 1 to 3 show the application of the invention to a vehicle suspension device of the type shown in my co-pending application, Serial No. 124,154, in which device a connection between the axle and vehicle frame is formed by a pivoted oscillatory supporting member A, conveniently in the form of a rocker arm, having its outer extremity, 10, connected by suitable means to the axle of the vehicle, such connection and axle being indicated in the drawing in dotted lines, and having its opposite extremity operatively connected to a supporting coil spring B, the supporting member A being pivotally mounted on a bracket C, which is connected to the chassis D. The form of pivotal support between the supporting member A and the bracket C, and the form of connection between the shorter arm 11 of the supporting member A, which is in the form of a bell crank lever, are as shown in my aforesaid earlier application, and not forming a part of the present invention, need not be described in detail. With the present form of the invention, however, it is not necessary to provide any rebound checking spring. The connection between the arm 11 and the supporting spring B is constituted by a tie-rod 12 pivotally connected to the arm 11 with a roller joint, as described in my aforesaid application, the outer end of the rod having a nut 13 threaded thereon, bearing against a dished spring plate washer 14 in turn bearing against the outer end of the spring B. The inner end of the spring is supported in a seat 15 which is in the form of a flanged washer bearing against the end panel of plate 16 constituting part of the supporting bracket C. To steady the movement of the connecting rod 12, a sleeve 17 is provided extending through the aperture 18 in the member 16, being flanged at its inner end to bear against the inner side of the member 16, and having a boss or projection 19 struck outwardly to bear against the flange 20 formed on the outer side of the member 16. The outer end of the sleeve 17 carries a helical bearing or filling member 21 supported between the flange 22 at the end of the sleeve and the inwardly extending boss 23, formed intermediate of the length of the sleeve, this filling member 21 being conveniently of wire or the like and designed to fill in the space between the connecting member and the sleeve, and hold the rod substantially in central position within the sleeve and prevent excessive lateral vibration in outer end of spring B.

For convenience in attachment, the bracket member C for the supporting members on opposite sides of the vehicle are preferably carried by a cross-beam E connected by a suitable attaching device F to the chassis; the lower part of the bracket C being given additional support by tie-rod G, all constructed and arranged as shown in my aforesaid application.

In accordance with the present invention, a braking device is provided between the supporting means for the member A, and the said member, whereby frictional resistance with an accelerated rate of gain will be offered to movement of said member from a given position or positions, and in further accordance with the present invention, I provide a friction drum H, mounted on and moving with the supporting member A, this drum being conveniently attached to the bearing hub 24 of the rocker arm, and having its axis coincident with the supporting edge of the segmental member 25, which constitutes a knife edge supporting the bearing pin 26, which is mounted within hub 24, as explained in my aforesaid application. The particular form of fastener shown between the drum H and the hub 24 is a set screw 27.

I indicates the brake band of suitable construction suitably lined with breaking material such as asbestos brake lining, and designed to be tightened about the drum by a suitable applicator J, which is actuated by movement of the supporting member A, and particularly by the longer arm, 28, thereof. This applicator is designed to apply the band to the drum with a self-winding or servo effect. It includes an operating lever, 29, pivotally mounted on a bearing pin, 30, which is formed integrally with but is eccentrically placed with respect to the supporting pin, 31, which extends through the side member, 32, of the bracket C, and is held in adjusted position by tightening the nut, 33, which has screw-threaded engagement with the outer end of the pin, 31. For convenience in turning the pin, 31, and thus adjusting the distances of the pin 30, from the brake drum and thereby adjusting the tightness of the brake band, I provide an adjusting lever, 34, formed with an aperture, 35, which fits the flattened portion of the pin, 34ª, and thus causes the pin to turn with it; the outer end of the lever, 34, being formed with a thumb or finger piece, 36, by means of which when the nut 33 is loosened, the position of the lever, 34, may be adjusted.

The operating lever, 29, is suitably journalled on the pin, 30, its fulcrum being intermediate of the pins 37 and 38 mounted on the lever and to which the ends of the brake band I are attached, the arrangement being such that turning of the lever 29 about its fulcrum in opposite directions will move one or the other of the pins 37 and 38 from the brake drum and thus tighten the pin. At the same time as one pin is moved away from the brake drum, the other will be moved towards it, and there will thus be produced the well-known self-winding or servo effect, i. e., as one end of the brake band is drawn away from the brake drum, the other is moved towards the brake drum and in part is wound about the drum, so that in addition to the braking action produced by the usual pressure between the band and the drum, there is an additional resistance produced by the self-winding of the brake band. This effect is in itself well known in the art and has the term "servo" or winding applied thereto.

The operating lever, 29, is adapted to be actuated by the movement of the supporting member A, and I accomplish this preferably by means of a yieldable or spring connection which will permit the desired gradual application of the brake. In the particular embodiment illustrated, the tie-rod or link, 39, is pivotally connected to the extremity of the lever, 29, and extends through a suitable hole in a swivel pin, 40, mounted on and journalled in the arm, 28. Suitable springs, 41 and 42, are provided on the rod, 39, on opposite sides of the swivel pin, 40, said springs bearing at their inner extremities against collars, 43 and 44, which bear against the swivel pin and at their outer extremities bear against collars 45 and 46, which bear against lock nuts 47 and 48, which are mounted on suitable screw threaded portions of the pin. 39. The springs, 41 and 42, in addition, can be tapered from one end to the other, i. e., the diameter of the helical turns are gradually enlarged from one end to the other, whereby the resistance to compression will increase in somewhat greater proportion than the amount of the compression.

The operation of this form of the device is substantially as follows:

Assuming that the parts are in a given normal position in which the braking device will not be applied, the load of the vehicle being supported from the axle through the supporting member A and the supporting spring B, upon relative movement occurring between the vehicle body and the axle, as for example, when the wheels of the vehicle meet an irregularity in the road surface, the body will move downwardly against the resistance of the spring B, which will provide a resilient resistance with a relatively constant rate of gain during the movement of the body. At the same time, the braking device will be thrown into operation in the following manner.

Any slack will first be taken up, and then the movement of the body will cause turning of the supporting member A on its pivot. This will cause the swivel pin, 40, to press against the collar 43, compressing the spring, 42, which will exert the pressure against the collar 46, which will be transmitted to the rod, 39, and tend to turn the operating lever, 29, about its fulcrum in a clockwise direction. This will move the pin, 37, away from the brake drum, H, and the pin, 38, towards the brake drum, causing the gradual application of the brake band, I, to the drum with servo effect, as already described, which effect will be increased in proportion to the amount of movement, thus applying a frictional resistance to the movement between the body and the axle with an accelerated rate of gain, finally bringing the body momentarily to rest, prior to its return under the rebound action of the spring B. On such rebound action the resistance of the spring will decrease with a constant rate of loss, while the frictional resistance will be released with an accelerated rate of loss, until a given position is reached at which the frictional resistance in one direction of the normal position will cease. The rebounding action, however, will cause the member, A, to move to the other side of its normal position, during which movement the spring B, will be gradually decreasing its pressure as it expands. Finally, the movement of the supporting member, A, will cause the applicator, J, to operate the braking means in the opposite direction, i. e., the pressure of the lever 29, transmitted through the collar, 44, to the spring, 41, and thus through the collar, 45, and nut, 48, to the rod, 39, will move the lever, 29, in an anti-clockwise direction, applying the brake band to the drum with self-winding effect in the opposite direction to which it has previously been applied, thereby offering frictional resistance with an accelerated rate of gain to the rebound movement of the vehicle body, finally bringing such movement to a stop, whereupon the body will tend to return to normal position under the action of the spring, B. This cycle of operation will then continue until the vibrations are finally damped and normal position resumed.

Referring now to the alternative form of the invention shown in Figures 4 and 5, and which is designed to be used where some other form of spring suspension than that described in my aforesaid earlier application is used, K indicates the chassis frame; L the car axle, M the brake drum which is stationary and fixed to the chassis, N the brake band extending about the drum, O the applicator for the brake band which includes the operating lever 50, fulcrumed to the pin, 51, on the bracket 52, which may be secured to the drum. The lever 50, on opposite sides of the fulcrum carries pins 53 and 54, which are secured to the extremities of the brake band. P indicates the main operating lever which is secured to and moves with the drum R and has its outer extremity connected with the axle by a suitable tie-rod, Q, having a pivotal connection at one end to the axle, and at the opposite end to the lever P. Suitable operating connection is formed between the lever, P, and the lever, 50, that shown embodying a rod or link, 55, pivotally connected to the extremity of the lever, 50, and extending through a suitable slot in the swivel pin, 56, mounted on the lever, P, this swivel pin bearing against collars 57 and 58, which bear against spring 59 and 60, mounted on the rod, 55, the opposite ends of these springs bearing against collars 61 and 62 which abut lock nuts 63 and 64, mounted on suitable threaded portions of the rod, 55.

The operation of this form of the invention, so far as braking effect is concerned, is as previously described with respect to the corresponding parts in Figures 1 to 3: given movement of the lever P from a given normal position caused by relative movement between the chassis frame and the car axle, will cause the brake to be applied in gradually increasing amount, so that frictional resistance with an accelerated rate of gain in either direction from a given position will be offered to relative movement between the frame and the axle, thus providing a convenient means for reducing the amplitude of the vibrations caused by irregularities in the road surface or by other means.

Both forms of the invention thus provide means by which the amplitude of the spring vibration may be regularly controlled. The reduction in the amplitude of the vibration will enable softer springs to be used or springs producing a lower periodicity in the vibratory movement, whereby the riding qualities of a vehicle may be improved. As many changes could be made in the above described construction, and many widely different embodiments of my invention constructed within the scope of the claims, without departing from the spirit or scope thereof, it is intended that all matter contained in the accompanying specifications and drawings, should be interpreted in an illustrative and not in a limiting sense.

What I claim is:

1. In a device of the character described, and in combination, a movable supporting member, means for offering resilient resistance with a constant rate of gain to the movement of said member from a given position, and other means for offering frictional resistance to said movement with an accelerated rate of gain.

2. In a device of the character described, and in combination, a movable supporting member, means for offering resilient resistance with a constant rate of loss to the movement of said member from a given position, and other means for offering frictional resistance to said movement with an accelerated rate of loss.

3. In a device of the character described, and in combination, a movable supporting member, means for offering resilient resistance with a consequent rate of gain to movement of said member from a given position in one direction, and with a constant rate of loss to movement of said member from said given position in an opposite direction, and other means for offering frictional resistance to said movement in either direction with an accelerated rate of gain from a given position.

4. In a device of the character described, and in combination, a movable supporting member, means for offering resilient resistance with a constant rate of loss to the movement of said member in one direction from a given normal position and other means for offering frictional resistance to said movement with an accelerated rate of gain.

5. In a device of the character described, and in combination, a movable supporting member, means for offering resilient resistance, with a constant rate of gain to movement of said member in one direction, and with a constant rate of loss to movement of said member in the opposite direction, and other means for offering frictional resistance to said movement with an accelerated rate of gain in either direction.

6. In a device of the character described, and in combination, a pivoted member and brake drum, movable with the member, and brake band for the drum, and an applicator for the band operated by the member.

7. In a device of the character described, and in combination, a pivoted member and brake drum, movable with the member, and brake band for the drum, and an applicator for the band operated by the member, adapted to apply the band with servo or self-winding effect.

8. In a device of the character described, and in combination, a pivoted member and brake drum, movable with the member, and brake band for the drum, and an applicator for the band operated by the member, adapted to wind the band in opposite directions about the drum, dependent upon the direction of movement of the said pivoted member.

9. In a device of the character described, and in combination, a pivoted member and brake drum, movable with the member, and brake band for the drum, and an applicator for the band operated by the member, and resilient connection between the applicator and the member.

10. In a device of the character described, and in combination, a pivoted member and brake drum, movable with the member, and brake band for the drum, and an applicator for the band operated by the member, and a power lever forming part of said applicator.

11. In a device of the character described, and in combination, a brake drum and pivoted member connected to and movable therewith, and brake band on the drum and power applying lever pivotally supported, with the power applying lever and brake band extending around the drum, connections between the power applying lever and the brake band whereby the brake band may be applied in opposite directions about the drum, and connections between the power applying lever and the pivoted member whereby movement of the pivoted member may operate the said lever.

12. In a device as claimed in claim 11, in which springs are included in the connection between the pivoted member and the power applying lever.

13. In a device as claimed in claim 11, in which the connections between the power applying lever and the pivoted member, comprise a swivel pin or member and rod pivotally connected to the lever connected to the pin, and springs on the rod bearing against opposite sides of the pin.

14. In a device of the character described, and in combination, a pivoted member and a brake drum and band therefor, an applicator operatively connected to the band and arranged to apply the band to the drum with servo effect, and a spring connection provided between the pivoted member and the applicator.

15. In a device of the character described, and in combination, a pivoted member and a brake drum and band therefor, a supporting spring operatively connected to the pivoted member, and an applicator operatively connected to the band and arranged to apply the band to the drum with servo effect, said applicator being connected to and operated by the pivoted member when the latter is moved from a given position.

16. In a device of the character described, and in combination, a pivoted member and a brake drum and band therefor, an applicator supported on an eccentrically mounted pin and operatively connected to the band to apply the band to the drum with servo effect, said applicator being connected to and operated by the pivoted member when the latter is moved from a given position.

17. In a device of the character described, and in combination, a pivoted member and a brake drum and band therefor, an applicator operatively connected to the band to apply the same to the drum with servo effect and a connection between the applicator and the pivoted member comprising a pair of springs and a button on the pivoted member to which the springs are operatively connected.

18. In a device of the character described, and in combination, a spring controlled load supporting member, means for offering accelerated frictional resistance to the movement of said member in either direction from a given position.

19. In a device as claimed in claim 18, in which the load supporting member is oscillatory.

20. In a device as claimed in claim 18, in which the means for offering frictional resistance comprises a friction drum and band.

21. In a device of the character described, and in combination, supporting means and spring controlled load supporting member mounted thereon, and means extending between the supporting means and the said member for offering accelerated frictional resistance to movement of the said member in either direction from a given position.

22. In a device as claimed in claim 21, in which a yieldable connection is provided between the last mentioned means and the said member.

23. In a device as claimed in claim 21, in which the connection between the supporting means and the member is adjustable.

24. In a device of the character described, and in combination, supporting means and spring controlled load supporting member mounted on the supporting means and curvilinear friction surface carried by said member, braking means contacting therewith, operating means for the braking means actuated by the said member.

25. In a device as claimed in claim 24, in which a yieldable connection is provided between the braking means and the member.

26. In a device as claimed in claim 24, in which a spring connection is formed between the member and the braking means.

27. In a device as claimed in claim 24, in which means are provided for adjusting the braking means to regulate the frictional resistance thereof.

In witness whereof I have hereunto set my hand.

ERIC JULIUS PILBLAD.